US010944758B1

(12) United States Patent
Nagargadde et al.

(10) Patent No.: US 10,944,758 B1
(45) Date of Patent: Mar. 9, 2021

(54) COMPUTER RESOURCE VULNERABILITY ASSESSMENT AND REMEDIATION

(71) Applicant: Amazon Technologies, Inc., Seattle, WA (US)

(72) Inventors: Aparna Nagargadde, Herndon, VA (US); Shane Anil Pereira, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 16/146,439

(22) Filed: Sep. 28, 2018

(51) Int. Cl.
*H04L 29/06* (2006.01)
*G06F 16/27* (2019.01)

(52) U.S. Cl.
CPC ............ *H04L 63/105* (2013.01); *G06F 16/27* (2019.01); *H04L 63/1433* (2013.01); *H04L 63/20* (2013.01)

(58) Field of Classification Search
CPC .................................. H04L 29/06; G06F 16/27
See application file for complete search history.

(56) References Cited

U.S. PATENT DOCUMENTS

| | | | | |
|---|---|---|---|---|
| 7,139,829 B2* | 11/2006 | Wenzel | ................... | H04L 12/66 709/232 |
| 8,539,567 B1* | 9/2013 | Logue | ................. | H04L 63/0428 726/7 |
| 9,461,877 B1* | 10/2016 | Nadeau | ................. | H04L 41/042 |
| 2011/0320799 A1* | 12/2011 | Lam | ................. | H04L 29/08981 713/2 |
| 2012/0155320 A1* | 6/2012 | Vohra | ...................... | H04L 45/44 370/254 |
| 2013/0275593 A1* | 10/2013 | Tseitlin | ................... | H04L 47/76 709/226 |
| 2014/0075139 A1* | 3/2014 | Reed | ..................... | G06F 9/5011 711/162 |
| 2014/0189868 A1* | 7/2014 | Laniepce | ............ | H04L 63/1416 726/23 |
| 2015/0271177 A1* | 9/2015 | Mun | ................... | H04L 63/0853 726/7 |

(Continued)

OTHER PUBLICATIONS

Singh et al., "A recursive Bayesian approach for identification of network configuration changes in distribution system state estimation," 2011 IEEE Power and Energy Society General Meeting Year: 2011 | Conference Paper | Publisher: IEEE.*

(Continued)

*Primary Examiner* — Roderick Tolentino
(74) *Attorney, Agent, or Firm* — Eversheds Sutherland (US) LLP

(57) ABSTRACT

Devices and methods are provided for determining computer resource connectivity and providing computer resource protection. A computer system may identify a first indication of each network configuration between a computing resource and a data resource. The system may identify a second indication of a request for credentials associated with accessing at least one of the computing resource or the data resource. The system may determine an action including accessing the computing resource and the data resource using a network configuration and a credential. The system may determine that the action has occurred a number of times that is less than a threshold. The system may cancel a credential or network configuration associated with the action.

20 Claims, 6 Drawing Sheets

(56) References Cited

U.S. PATENT DOCUMENTS

2015/0350177 A1* 12/2015 Sharp ................ H04W 12/0609
        726/6
2018/0121665 A1* 5/2018 Anderson ........... G06F 21/6209

OTHER PUBLICATIONS

Ge et al., "A method of multi-VM automatic network configuration," 2009 IEEE International Conference on Intelligent Computing and Intelligent Systems Year: 2009 | vol. 3 | Conference Paper | Publisher: IEEE.*

* cited by examiner

COMPUTER RESOURCE VULNERABILITY ASSESSMENT AND REMEDIATION

BACKGROUND

Cloud computer resources exist in different types and formats, such as cloud computing resources and data resources. Cloud computer resource security may affect websites and online services. When cloud computer users configure accounts and subscribe to cloud computer resources, the configurations may allow unauthorized access to cloud computer resources. Access to computer resources may be controlled by access rules and network connectivity paths. Allowing access to one type of computer resource may result in unintended access to another computer resource. Also, computer resource permission levels may exceed actual use of the computer resources, resulting in unwarranted permissions. However, assessing computer resource access risks and the impact of changing computer resource access may be difficult.

Figure 1:
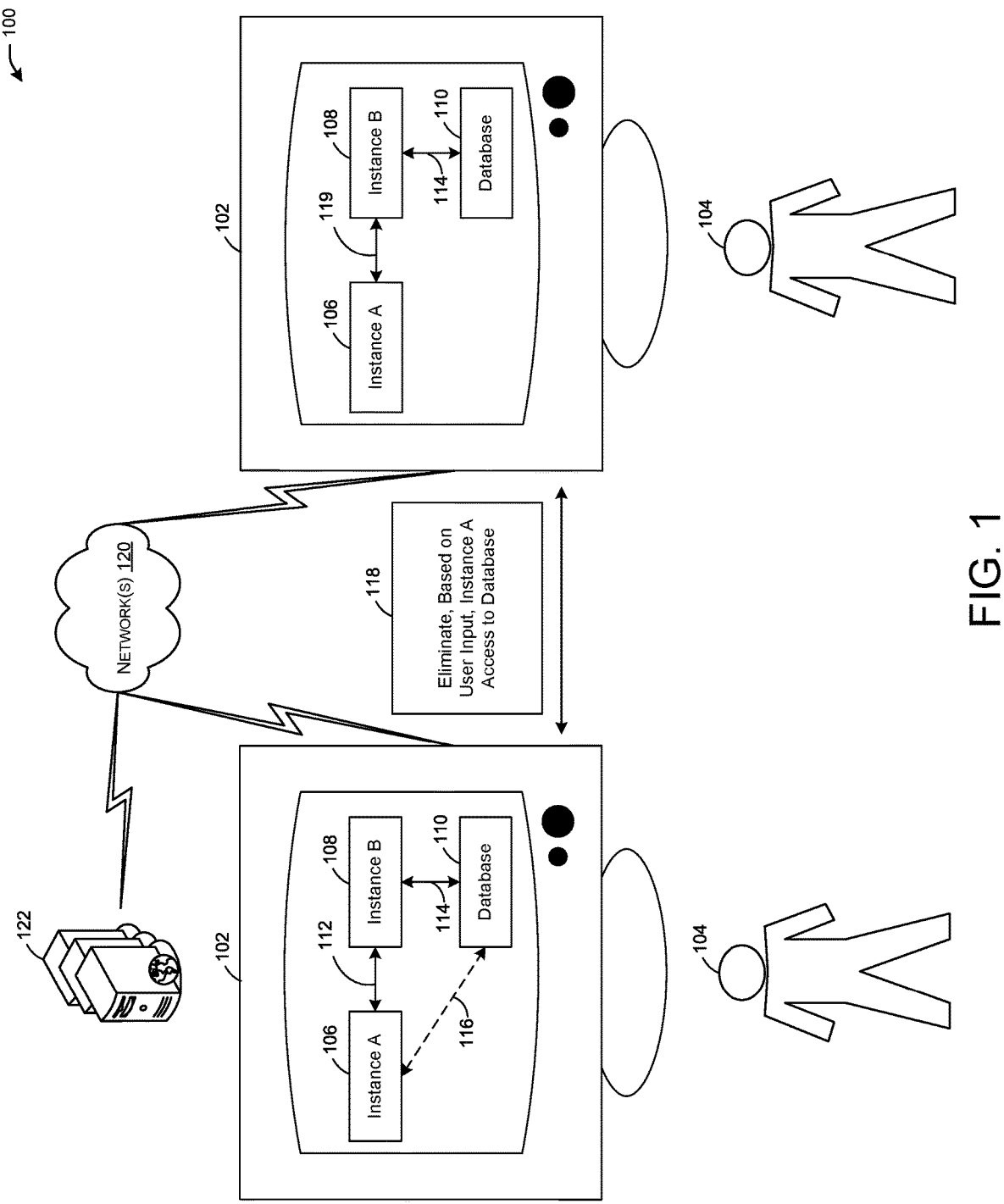
FIG. 1 illustrates a process for controlling access between computer resources, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for controlling access between computer resources. Computer resources may include computing resources (e.g., cloud computing, resources for executing code without provisioning multiple servers, etc.), data resources (e.g., database resources, database services, message queuing services, etc.), and other computer resources. Instances may occur for different types of computer resources. An instance may refer to an occurrence of an object of any class. For example, a database instance may refer to a set of memory which may manage database files or data. Computing resources may have access to other computing resources, and data resources may have access to other data resources.

Computing resources and data resources also may access each other. For a computing resource to access a data resource (or vice versa), two types of connectivity may facilitate the access: network connectivity and identity and access management (IAM). Network connectivity may refer to a network path between the computing and data resource (or between any types of computer resources), and IAM may control access using roles associated with an instance, a lambda (e.g., anonymous, without an identifier) function, or resource specific permissions.

Computer resource users and administrators may want to limit access to applications, for example, which data and computing resources to which an instance may have access, and the extent of the access. In some situations, users manually may analyze IAMs and network configurations and, may perform manual changes to resource access. Such manual processes may require an understanding of the complex nature of the ways in which IAMs and network configurations may control access to computing resources. Therefore, monitoring and reporting of computing resource access may be improved through automation and combining network connectivity information and IAM configurations to identify available connectivity/configurations between resources and to manage changes to available connectivity and access. In particular, the automated monitoring and reporting of connectivity between computing and data resources may improve computer resource access management.

An IAM manager may manage IAM permissions such as user or group roles and policies. An IAM manager may monitor which roles and policies have been used. For example, an IAM manager may limit the ability of individual users to perform specific tasks such as viewing, creating, or modifying a file. To manage access to resources, IAM managers may use sign-in systems, multifactor authentication, and other technologies which may restrict access and user functionality. IAM managers may maintain user login information and user privileges, and may capture user logins (e.g., execution of logins). User permissions and privileges may be assigned according to policies and roles. However, access management may benefit from evaluating not only IAM usage, but also possible usage of IAM credentials which may be used in the future even if they have not yet been used. An IAM manager which manages IAM permissions for accessing computer resources may send IAM permission data to event logs for storage. An IAM may collect IAM permission data from a cloud and provide the data to one or more other systems or devices for analysis.

A network configuration manager may execute reachability tests. Such tests may identify used network connectivity and/or possible network configurations between like computer resources. For example, a network configuration manager may identify network connectivity (e.g., existing connections) and configurations (e.g., possible connections) between data resources, and may identify network connectivity and configurations between computing resources. The network configuration manager may identify access from the Internet. Active network scanners and flow logs may include information which indicates what an application is doing (e.g., what resources are being accessed) and which network paths are being used. However, access management may benefit from extending network connectivity evaluations to consider connectivity between computing and data resources, and from identifying possible network configurations which might be used in the future even if the configurations have not yet been used. A network configuration manager may manage and facilitate network configurations between cloud computing resources, and may send connectivity/configuration data to event logs for storage. A network configuration manager may receive connectivity/configuration data from the cloud, and may provide the connectivity/configuration data to one or more other devices or systems for analysis.

Access management using evaluations of possible connectivity between computing and data resources may enable document application infrastructure (e.g., for recurring audits), automated threat modeling, analysis of what may happen if access rules are modified, the use of threat modeling and detection of unused access paths (e.g., using flow logs, domain name system logs, on-host agent data, etc.), and automatic removal of unused access paths, for example.

An access management system may receive network connectivity/configuration information and IAM information from the network configuration manager, IAM manager, and event logs, and may evaluate a computing resource, for example, and may provide a vulnerability assessment of a network configuration associated with the computing resource. For example, the assessment may identify existing network connections between a computing resource and other computing resources. Such access management may benefit from monitoring access control of the computing resource and/or the other computing resources. Using the information received from the network configuration manager, the IAM manager, and the event logs, for example, the access management system may determine existing network connectivity, possible network configurations, IAM permissions, event data, etc. The access management system may determine not only which computer resources are accessing other resources, but also potential computer resource access based on possible network configurations and permissions.

Vulnerability assessments may be based on known rules associated with excessive resource permissions, unwanted network paths/configurations, inactive/unused users, excessive IAM permissions, excessive resource access, unused/deprecated IAM users, etc. The rules may be applied based on which computer resources are involved, so a recommendation for a identified vulnerability of one computer resource may differ from a recommendation for the same identified vulnerability of a different computer resource. A priority of a vulnerability may be different based on reachability of computer resources. For example, an excessive IAM permissive role on a computing resource that is Internet-accessible may be considered a higher priority than an instance which is not reachable by an Internet user/device.

Computing resources may exist in a variety of categories and types. For example, instances, containers, and lambda are types of computing resources which may be used for different applications. Computing resources may access and manipulate data within other types of services which may include database resources (e.g., data resources). Using IAM managers may result in using roles instead of shared credentials for multiple users in order to control resource access. However, roles may be more permissive than they need to be, allowing for unnecessary resource access and permissions.

When developing an application which uses computer resources, it may be convenient to start with highly permissive user roles. For example, a message queuing service may allow all messaging service operations instead of limiting permissions to sending messages. In an environment with a large number of applications, services, and application programming interfaces (APIs), development of a new service or application may result in security vulnerabilities which may be difficult to evaluate and rectify over time. Therefore, access management may be improved by increasing visibility (e.g., showing excess permissions to resources), facilitating remediation (e.g., providing remediation guidance or automatically remediating access vulnerabilities), and improving access customization. Remediation may be improved by considering all attached entities of a computer resource policy/permission, and by targeting specific policies based on the type of computer resources evaluated.

To improve access management, multiple services may be used to collect useful information. For example, a call log service may log API calls (e.g., as events). API calls may include calls from a data pipeline console and to data pipeline operations. API calls may be captured in an event history, and log files indicating API calls may be delivered to a bucket for user monitoring. An IAM manager may identify when a specific "attached-entity" (e.g., IAM role, IAM user, account, etc.) has used a specific policy to access a particular resource. A network manager may identify network connectivity between resources. An IAM manager may send IAM permission data to logs, and a network configuration manager may send network configuration/connectivity data to the logs. Call/flow logs may indicate which resources access/communicate with each other. Real-time network data may allow an access management system to identify possible access changes and determine which changes may be allowed. Other services may compare access policies and determine if a policy is more permissive than another policy, and may identify particular or unusual events published by a service.

As a result of embodiments of the disclosure, computer resource access management may be improved by identifying possible access and configurations between computing and data resources in addition to exercised connectivity and access. Graphical outputs may simplify complicated configurations for users to facilitate access modification and customization, and automatic remediation of complicated configurations and access vulnerabilities may result in improved control and security associated with computer resources.

In one or more embodiments, improved computer resource access may consider resource-level permissions, IAM roles and their attached-entities (e.g., instances, IAM policies, services, tagged resources, etc.), and cross-account roles.

Some computer services may support resource-level permissions. Such permissions may be defined for specific resources such as messaging services and database tables, and may allow specific users to invoke particular APIs on given resources. When considering resource-level permissions, there are multiple areas which may be evaluated to improve computer resource access control, such as excessive permissions on a resource and inactive/unused users. Excessive permissions may refer to when resource-level permissions are more permissive than the usual access patterns for a resource. For example, access patterns may indicate that resources are not using permitted actions.

In one or more embodiments, if a normal access pattern for a message service is a send message function, but the resource allows for any messaging function associated with the service, than an excessive permission may be identified. An inactive/unused user may be identified when a resource is accessed by a smaller subset of users/roles/services than is specified in a resource-based permission. For example, a messaging service may allow multiple IAM users to write to the messaging service, but maybe only one IAM user has been active for a while, or maybe some of the IAM users do not even exist. Excessive permissions and unused users may be canceled once they have been identified. Determining a normal access pattern may include determining if a particular access/use is identical or similar to other access/use detected from the same or other resources.

Some computer resources support IAM policies and attached-entities. Users may rely on IAM roles to delegate access to users, applications, or services which normally may not have access to certain computer resources. An advantage of using IAM roles instead of resource-level permissions is that a single role may apply to multiple resources. However, reducing the scope of permissions within a role may be a complicated task, and roles are often left untouched once an application has been developed. Therefore, to control computer resource access, IAM policies may be evaluated for excessive permissions, excessive resource access, and unused/depreciated IAM users.

An excessive IAM permission may refer to when an IAM role allows for calling more APIs than a user intended. For example, a user may allow Read Only permissions on a role, but only intended to allow the role to be able to read from a subset of services (e.g., a list of available services). Excessive IAM resource access may refer to when a role allows a caller to read/modify more resources than may be necessary for a specific application. For example, an excessive resource access may allow API calls to a database resource on all tables in an account rather than limiting calls to a specific table in the database resource. Unused/depreciated IAM users may refer to when a specific role is attached to some IAM users who have been inactive for long periods or to a set of resources which have never exercised a particular role.

In one or more embodiments, an IAM manager may provide a date and time when an IAM entity (e.g., user, group, role, etc.) last accessed a computer service through an IAM policy permission. Users may access this data to determine how to restrict roles and policies, or this information may be collected by a computer system and combined with other relevant connectivity/configuration data to identify vulnerabilities.

In one or more embodiments, a computer system may provide indications of which roles are used by customers and computing resources. The computing system may indicate excessive permissions associated with the roles. The computer system may provide recommendations regarding ways to restrict roles at both the service and resource levels. The computer system automatically may remediate such vulnerabilities. For example, the computer system may monitor roles and permissions and may apply policies to make access and connectivity/configuration changes. Monitoring and modification may be applied to a subset of resources at any given time period, and may allow for users to provide exceptions (e.g., excluded policies/resources).

In one or more embodiments, at any given time, a computer system may collect information used to identify network configurations and IAM access. For example, a network mapping device may provide network connectivity mappings which may indicate network configurations between resources. Using trail logs, flow logs, API and DNS calls, etc., the network mapping device may identify when an instance of one type of computer resource accesses another resource (e.g., a computing resource accesses a database resource). An IAM manager may indicate when a permission was used to access a resource. The computer system may collect information from the network configuration manager and the IAM manager, and may combine the information to identify vulnerabilities such as excessive permissions, unwanted network paths/configurations, inactive users, excessive resource access, etc. For example, a network connection may exist between a computing resource and a data resource (e.g., as indicated by a computing resource accessing a data resource), but if account credentials/permissions/security do not allow the computing resource to call the data resource and perform any actions, or only allow certain actions, then there may be no vulnerability. If network connectivity/configurations exist between a computing resource and a data resource, and if credentials/permissions/security may permit access of the data resource by the computing resource or by another device/resource through an established connection with the computing resource, then a vulnerability may be detected.

The computer system may generate one or more graphical representations of network configurations and vulnerabilities. For example, if a computing resource instance A accesses a computing resource instance B, and computing resource instance B has access to a database resource, the computer system may identify that the computing resource instance A may be able to access the database resource through computing resource instance B even if such access has not yet occurred or has not occurred a sufficient number of times. The computer system may determine that the computing resource instance A may access the database resource directly even if the access has not occurred a sufficient number of times or at all. The computer system may provide a graphical output indicating the existing and possible access between resources, and may include indications of past access, possible access, and recommendations for remediating vulnerabilities associated with the possible access. The computer system may receive one or more inputs from a user indicating access modifications and/or may provide automatic remediation. Once access has been modified, updated graphical outputs may be provided to indicate the modifications in a simplified manner to a user.

In one or more embodiments, a user may onboard an account or set of accounts to be monitored. A service may query other services to receive configuration information associated with user resources. Based on the configuration information, graphical representations may be output. For example, a network connectivity graph may be generated and may show network reachability (e.g., a computing resource to computing resource connectivity/configurations for two instances in a same subnet, computing resource to data resource connectivity/configurations in which a computing resource may access a database resource using a virtual private cloud endpoint, etc.). An IAM connectivity graph may be generated and may show IAM reachability (e.g., a computing resource to computing resource IAM connectivity indicating that a computing resource instance may launch a lambda function, a computing resource to data resource IAM connectivity indicating that a lambda function may have a role which allows it to list and receive objects from a data resource, etc.).

The above descriptions are for purposes of illustration and are not meant to be limiting. Numerous other examples, configurations, processes, etc. may exist, some of which are described in greater detail below. Example embodiments will now be described with reference to the accompanying figures.

Illustrative Processes and Use Cases

FIG. 1 illustrates a process 100 for controlling access between computer resources, in accordance with one or more example embodiments of the present disclosure.

Referring to FIG. 1, the process 100 may include a computer system 102 (e.g., a client device) presenting computer resource access assessments to a user 104. The computer system 102 may display a graphical representation indicating resource reachability including a computing resource instance A 106, computing resource instance B 108, and database resource 110. The computer system 102 may indicate an access 112 between the computing resource instance A 106 and the computing resource instance B 108, which may represent an actual access of the computing resource instance B 108 by the computing resource instance A 106. The computer system 102 may indicate an access 114 between the computing resource instance B 108 and the database resource 110, which may represent an actual access of the database resource 110 by the computing resource instance B 108. Because the computing resource instance A 106 has access to the computing resource instance B 108, the computer system 102 may indicate that the computing resource instance A 106 potentially may access the database resource 110 through an access 116, which may be an undesirable or unintended access as a result of the access 112 and/or IAM permissions associated with the computing resource instance A 106 and the computing resource instance B 108.

At operation 118, the computer system 102 may facilitate elimination of the access 116 based on an input received from the user 104 and/or using an automatic remediation process. Eliminating the access 116 may refer to eliminating/canceling a network path/configuration, canceling an IAM permission (e.g., removing an inactive user, removing an excessive permission, removing a network path/configuration, removing an excessive access to the database resource 110, etc.). If the instance A 106 is able to access the database 110 transitively (e.g., through access of the instance B 108) because, for example, instance A 106 and the instance B 108 may have the same security group/level, then eliminating/canceling the access 116 may include modifying the access 112 by changing the security group/level of the instance A 106 and/or the instance B 108, or eliminating the path between the instance A 106 and the instance B 108. As a result, the computer system 102 may generate a new graphical representation of the connectivity/configurations associated with the computing resource instance A 106, the computing resource instance B 108, and the database resource 110 (e.g., in which the access 116 is no longer showing because it has been canceled). The access 112 may become access 119, which may represent a different access between the instance A 106 and the instance B 108. Automatic remediation may include using set rules which identify certain access/permissions to be canceled if identified once or a number of times. A vulnerability may be assigned a threat value, and if the threat value exceeds a threat level, the access/permission associated with the vulnerability may be modified or eliminated. For example, the threat level of an excessive permission, unused user account, excessive resource, unwanted network connectivity/configurations, etc. may differ depending on the computer resource involved (e.g., an excessive permission for one computing resource may have a higher threat level than an excessive permission for another computing resource).

The computer system 102 may connect to one or more communication networks 120, which may also connect to one or more servers 122. For example, the one or more servers 122 may provide information used to generate the graphical output. The one or more servers 122 may provide network configuration information (e.g., existing and possible connections between resources) which may indicate that the computing resource instance A 106 and the computing resource instance B 108 have access 112 to one another, and that the computing resource instance B 108 and the database resource 110 have access 114 to one another (e.g., network configurations and IAM permissions). The one or more servers 122 may provide an indication that the computing resource instance B 108 has IAM permissions allowing the access 114 to the database resource 110 and that the computing resource instance A 106 has IAM permissions allowing the access 112 to the computing resource instance B 108. The one or more servers 122 may determine the possible access 116 of the database resource 110 by the computing resource instance A 106 even if access/connectivity/configuration information may not indicate that the computing resource instance A 106 has used the access 116 to the database resource 110. The access 116 may be identified as a vulnerability, and a graphical output may indicate not only the possible vulnerability, but also how network configuration and access may be impacted by canceling the access 116. The result of canceling the access 116 may be shown in an updated graphical representation by the computer system 102.

In one or more embodiments, the graphical presentation may include only network configurations and/or permissions identified as vulnerabilities. For example, if the access 116 is the only access identified as a vulnerability, then the graphical presentation may not include other connections (e.g., the graphical presentation may include the instance A 106, the database resource 110, and the access 116, but not the instance B 108 and the access 114). If the access 116 is removed/cancelled, then an updated graphical presentation may be generated to show network configurations (e.g., access 114) identified as being appropriate (e.g., not a threat/vulnerability).

Figure 2:
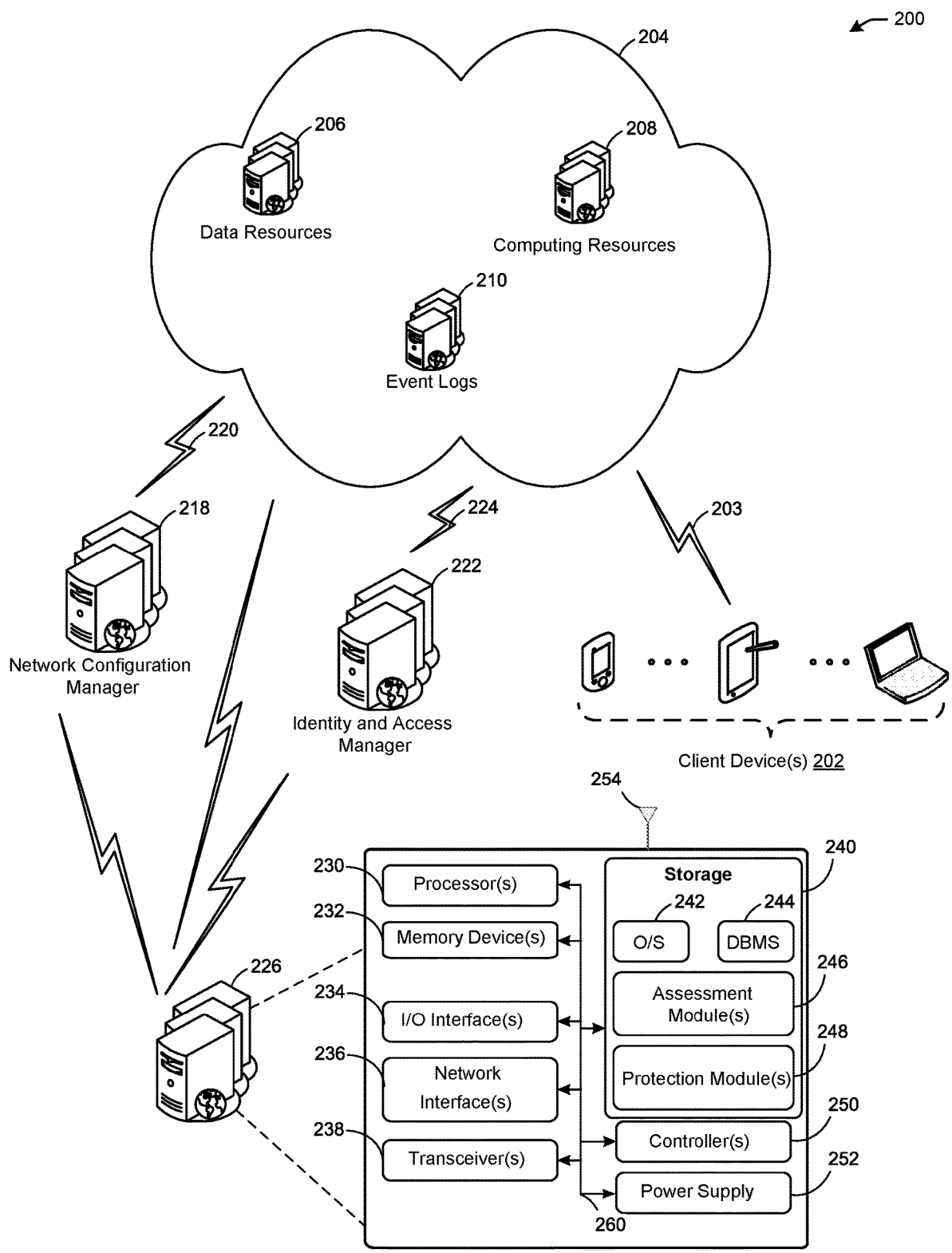
FIG. 2 illustrates a system for monitoring and controlling access between computer resources, in accordance with one or more example embodiments of the present disclosure.

FIG. 2 illustrates a system 200 for monitoring and controlling access between computer resources, in accordance with one or more example embodiments of the present disclosure.

Referring to FIG. 2, the system 200 may include one or more client devices 202 accessing computer resources (e.g., via a network connection 203) hosted by a computing cloud 204 (e.g., shared computer resources). The computer resources may include data resources 206 and computing resources 208, any of which may be shared computer resources on one or more computers in a cloud computing environment. The data resources 206 and computing resources 208 may include one or more computers (e.g., servers) with processing and memory. The computing resources 208 may include shared cloud computing, shared serverless computing, shared virtual servers, etc. The data resources 206 may include shared database resources and database services, virtual message queuing services, and other shared data storage.

Event logs 210 (e.g., API call logs, flow logs, DNS query logs, etc.) may refer to one or more computers or servers which may maintain a record of computer events indicating computer actions such as accessing/calling computer resources. The computer actions may be associated with a user account (e.g., a user of the one or more client devices 202), role, device, or computer service, any of which may be indicated by entries in the event logs 210. The event logs 210 may capture API calls as events. Network connections between the data resources 206 and the computing resources 208 may represent the network connections (e.g., actual connections) and configurations (e.g., possible connections) between the data resources 206 and the computing resources 208. The event logs 210 may receive indications of API calls for the data resources 206, and may receive indications of API calls for the computing resources 208. The event logs 210 may indicate requests to the data resources 206 and the computing resources 208, an address (e.g., IP address) from which a request was made, a user account/login associated with the request, permissions/credentials used to access a computer resource, and other information associated with the request.

A network configuration manager 218 may connect to the computing cloud 204 via connection 220 to receive network connectivity/configuration data. For example, the network connectivity/configuration data may include indications of network connections and possible network configurations between the computer resources, and the network configuration manager 218 may use the network connectivity/configuration data to determine network connections/configurations (e.g., used and unused) between the computer resources. The network configuration manager 218 may facilitate connectivity between the data resources 206 and the computing resources 208, and/or may receive connectivity/configuration data from the cloud 204. The network configuration manager 218 may send network connectivity/configuration data to the event logs 210.

An IAM manager 222 may connect to the computing cloud 204 via connection 224 to receive permission data indicating user/group permissions used to access the computer resources hosted by the computing cloud 204. Using the permission data (e.g., used and unused), the IAM manager 222 may determine IAM permissions which may be used to access the computer resources. The IAM manager 222 may facilitate access of the data resources 206 and the computing resources 208 by managing IAM permissions used to access the resources. The IAM manager may receive data indicating which IAM permissions are used to access the resources, and may send the IAM permission data to the event logs 210.

In one or more embodiments, the computing cloud 204 may provide network connectivity and configuration data associated with the computer resources (e.g., all network connectivity availability between the computer resources) to the network configuration manager 218. Network configuration and network connectivity data provided to the network configuration manager 218 may indicate which computer resources are communicating with/accessing one another. Real-time network and configuration data, static network connectivity data, and with IAM permission data may be provided to a computer system 226 (e.g., from the network configuration manager 218, the IAM manager 222, and/or the event logs 210), and the computer system 226 may determine possible network configurations between the computer resources and/or IAM permissions to access the computer resources. The computer system 226 may determine possible vulnerabilities associated with the network configurations and IAM permissions, and may identify access/connectivity changes which may be made to eliminate access to/permissions associated with computer resources. The computer system 226 may provide graphical data (e.g., as shown in FIG. 1) to the one or more client devices 202 through the computing cloud 204. The graphical data may indicate existing and possible network connectivity between computer resources, along with IAM permissions allowing users to access computer resources. For example, the graphical data may be presented by the one or more client devices 202 and may indicate network connectivity/configuration between computing and data resources, IAM permissions allowing a user of a computing resource to access a data resource (or vice versa), possible actions available for user selection to cancel access, permissions, connectivity, and configurations, indications of automatic remediation (e.g., automatic cancellation of access/permissions), etc.

The IAM manager 222 may determine IAM usage, for example, IAM permissions used to access the data resources 206 and/or the computing resources 208. User/group credentials used to access the data resources 206 and/or the computing resources 208 may be received from the computing cloud 204 and/or the IAM manager 222 by the computer system 226. The network configuration manager 218 may determine network reachability, and may provide network reachability data to the computer system 226. The computer system 226 may collect information from the network configuration manager 218, the IAM manager 222, and/or the event logs 210, and may determine network connectivity and configurations between the data resources 206 and the computing resources 208, along with possible IAM permissions (e.g., IAM permissions available, but not being used).

Still referring to FIG. 2, the computer system 226 may include one or more components, such as one or more processors 230, one or more memory devices 232, one or more input/output interfaces 234, one or more network interfaces 236, one or more transceivers 238, storage 240 (e.g., which may include one or more operating systems 242, one or more database management systems 244, one or more assessment modules 246, and one or more protection modules 248), one or more controllers 250, a power supply 252, and one or more antenna(e) 254. The components may be connected by one or more buses 260.

The storage 240 may include removable storage and/or non-removable storage including, but not limited to, magnetic storage, optical disk storage, and/or tape storage. The storage 240 may provide non-volatile storage of computer-executable instructions and other data. The storage 240, removable and/or non-removable, is an example of computer-readable storage media (CRSM) as that term is used herein.

The storage 240 may store computer-executable code, instructions, or the like that may be executable by the one or more processors 230, to cause the one or more processors 230 to perform or initiate various operations (e.g., operations associated with computer-executable instructions for the one or more assessment modules 246 and/or the one or more protection modules 248). The storage 240 may additionally store data that may be copied for use by the one or more processors 230 during the execution of the computer-executable instructions. Moreover, output data generated as a result of execution of the computer-executable instructions by the one or more processors 230 may be copied to the storage 240 for non-volatile storage.

More specifically, the storage 240 may store one or more program module(s), applications, engines, computer-executable code, scripts, or the like. Some or all of these module(s) may be or include sub-module(s). Any of the components depicted as being stored in the storage 240 may include any combination of software, firmware, and/or hardware. The software and/or firmware may include computer-executable code, instructions, or the like that may executed by one or more of the one or more processors 230. Any of the components depicted as being stored in the storage 240 may support the functionality described in reference to the corresponding components named earlier in this disclosure.

The storage 240 may further store various types of data utilized by the components of the computer system 226. Any data stored in the storage 240 may be used by the one or more processors 230 in executing computer-executable code. In addition, any data depicted as being stored in the storage 240 may potentially be stored in one or more datastore(s). The datastore(s) may include, but are not limited to, databases (e.g., relational, object-oriented, etc.), file systems, flat files, distributed datastores in which data is stored on more than one node of a computer network, peer-to-peer network datastores, or the like.

The storage 240 may store the one or more assessment modules 246 and the one or more protection modules 248. The one or more assessment modules 246 may provide executable code for receiving network connectivity/configuration data from the network configuration manager 218, receiving IAM data from the IAM manager 222, receiving data from the event logs 210, determining network connectivity/configuration associated with the data resources 206 and the computing resources 208 (e.g., determining each network path between the data resources 206 and the computing resources 208), identifying vulnerabilities such as excessive permissions, unwanted network paths/configurations, and inactive users, determining recommendations for modifying access, providing impact assessments associated with access modifications, and causing graphical outputs indicative of access, vulnerabilities, and modifications. The one or more protection modules 248 may provide executable code for determining the impact of access vulnerabilities and modifying access based on user inputs and/or using automatic remediation.

The one or more processors 230 may be configured to access the storage 240 and execute the computer-executable instructions loaded therein. For example, the one or more processors 230 may be configured to execute computer-executable instructions of the various program module(s), applications, engines, or the like of the computer system 226 to cause or facilitate various operations to be performed in accordance with one or more embodiments of the disclosure. The one or more processors 230 may include any suitable processing unit capable of accepting data as input, processing the input data in accordance with stored computer-executable instructions, and generating output data. The one or more processors 230 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the one or more processors 230 may have any suitable microarchitecture design that includes any number of constituent components such as, for example, registers, multiplexers, arithmetic logic units, cache controllers for controlling read/write operations to cache memory, branch predictors, or the like. The microarchitecture design of the one or more processors 230 may be capable of supporting any of a variety of instruction sets.

The transceivers 238 may include any suitable type of transceiver depending, for example, on the communications protocols used to transmit or receive signals. The transceivers 238 may additionally, or alternatively, include a Wi-Fi transceiver configured to transmit or receive signals in accordance with established standards and protocols. The transceivers 238 may include any suitable radio component(s) for transmitting or receiving signals in a bandwidth and/or channels. The transceivers 238 may include any known receiver and baseband suitable for communicating via the communications protocols utilized by the computer system 226. The transceivers 238 may further include a low noise amplifier (LNA), additional power signal amplifiers (PA), an analog-to-digital (A/D) converter, one or more buffers, a digital baseband, or the like.

It should be appreciated that the program module(s), applications, computer-executable instructions, code, or the like depicted in FIG. 2 as being stored in the storage 240 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system 226, and/or hosted on other computing device(s) accessible via one or more networks, may be provided to support the functionality provided by the program module (s), applications, or computer-executable code depicted in FIG. 2 and/or additional or alternate functionality. Further, functionality may be modularized differently such that processing described as being supported collectively by the collection of program module(s) depicted in FIG. 2 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 2 may be implemented, at least partially, in hardware and/or firmware across any number of devices.

It should further be appreciated that the computer system 226 may include alternate and/or additional hardware, software, or firmware components beyond those described or depicted without departing from the scope of the disclosure. More particularly, it should be appreciated that software, firmware, or hardware components depicted as forming part of the computer system 226 are merely illustrative and that some components may not be present or additional components may be provided in various embodiments. While various illustrative program module(s) have been depicted and described as software module(s) stored in the storage 240, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

The computer system 226 may further include one or more buses 260 that functionally couple various components of the computer system 226. The bus(es) 260 may include at least one of a system bus, a memory bus, an address bus, or a message bus, and may permit the exchange of information (e.g., data (including computer-executable code), signaling, etc.) between various components of the computer system 226. The bus(es) 260 may include, without limitation, a memory bus or a memory controller, a peripheral bus, an accelerated graphics port, and so forth. The bus(es) 260 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 232 of the computer system 226 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 232 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 232 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The storage 240 may store computer-executable code, instructions, or the like that may be loadable into the memory 232 and executable by the one or more processors 230 to cause the one or more processors 230 to perform or initiate various operations. The storage 240 may additionally store data that may be copied to the memory 232 for use by the one or more processors 230 during the execution of the computer-executable instructions. Moreover, output data generated as a result of execution of the computer-executable instructions by the one or more processors 230 may be stored initially in the memory 232, and may ultimately be copied to the storage 240 for non-volatile storage.

More specifically, the storage 240 may store one or more operating systems (O/S) 242; one or more database management systems (DBMS) 244; and one or more program module(s), applications, engines, computer-executable code, scripts, or the like such as, for example, the one or more assessment module(s) 246 and the one or more protection modules 248. Some or all of these module(s) may be or include sub-module(s). Any of the components depicted as being stored in the storage 240 may include any combination of software, firmware, and/or hardware. The software and/or firmware may include computer-executable code, instructions, or the like that may be loaded into the memory 232 for execution by one or more of the one or more processors 230. Any of the components depicted as being stored in the storage 240 may support the functionality described in reference to the corresponding components named earlier in this disclosure.

The storage 240 may further store various types of data utilized by the components of the computer system 226. Any data stored in the storage 240 may be loaded into the memory 232 for use by the one or more processors 230 in executing computer-executable code. In addition, any data depicted as being stored in the storage 240 may potentially be stored in one or more datastore(s) and may be accessed via the DBMS 244 and loaded in the memory 232 for use by the one or more processors 230 in executing computer-executable code.

Referring now to other illustrative components depicted as being stored in the storage 240, the O/S 242 may be loaded from the data storage 240 into the memory 232 and may provide an interface between other application software executing on the computer system 226 and the hardware resources of the computer system 226. More specifically, the O/S 242 may include a set of computer-executable instructions for managing the hardware resources of the computer system 226 and for providing common services to other application programs (e.g., managing memory allocation among various application programs). In certain example embodiments, the O/S 242 may control execution of the other program module(s) to dynamically enhance characters for content rendering.

The DBMS 244 may be loaded into the memory 232 and may support functionality for accessing, retrieving, storing, and/or manipulating data stored in the memory 232 and/or data stored in the storage 240. The DBMS 244 may use any of a variety of database models (e.g., relational model, object model, etc.) and may support any of a variety of query languages. The DBMS 244 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the computer system 226, the input/output (I/O) interface(s) 234 may facilitate the receipt of input information by the computer system 226 from one or more I/O devices as well as the output of information from the computer system 226 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system 226 or may be separate. The I/O devices may further include, for example, any number of peripheral devices such as data storage devices, printing devices, and so forth. The I/O interface(s) 234 may also include an interface for an external peripheral device connection such as universal serial bus (USB), micro-USB, FireWire, Thunderbolt, Ethernet port or other connection protocol that may connect to one or more networks.

The computer system 226 may further include one or more network interface(s) 236 via which the computer system 226 may communicate with any of a variety of other systems, platforms, networks, devices, and so forth. The network interface(s) 236 may enable communication, for example, with one or more wireless routers, one or more host servers, one or more web servers, and the like via one or more networks. For example, the one or more network interface(s) 236 may enable the computer system 226 to communicate with any combination of the data resources 206, the computing resources 208, the IAM manager 222, the event logs 210 (e.g., DNS call logs, API call logs, cloud call logs, etc.), the network configuration manager 218, and the one or more client devices 202.

The controller(s) 250 may be any microcontroller or microprocessor configured to control one or more operations of the one or more processors 230. The power supply 252 may be a battery, such as a lithium-ion battery. The power supply 252 may be provided power from a power receptacle or other power charging device.

The computer system 226 may include one or more antenna(e) 254 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

Any of the connections (e.g., connection 220, connection 224) may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the connections may have any suitable communication range associated therewith and may include, for example, global networks (e.g., the Internet), metropolitan area networks (MANs), wide area networks (WANs), local area networks (LANs), or personal area networks (PANs). In addition, any of the connections may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In one or more embodiments, the computer system 226, using the one or more assessment modules 246, may identify existing network connectivity, possible network configurations, and IAM-based access and/or resource-specific permissions, and may generate one or more graphs. One graph may include a network connectivity graph showing one or more network paths (e.g., a static snapshot of the access 112 of FIG. 1), which may indicate any and all connectivity/configurations between the computing resources 208 and the data resources 206, and may indicate connectivity/configurations between a computing resource and a data resource. Another graph may indicate JAM connectivity/configurations. For example, an JAM connectivity graph may indicate that a computing resource instance may launch lambda functions and/or that a lambda function has a role permitted to lest and receive objects from a data resource. The network connectivity and JAM graphs may be combined to show used network connectivity and JAM permissions, and also possible network configurations and JAM permissions which may be used and/or are not being used, including complex connections between resources.

Figure 3:
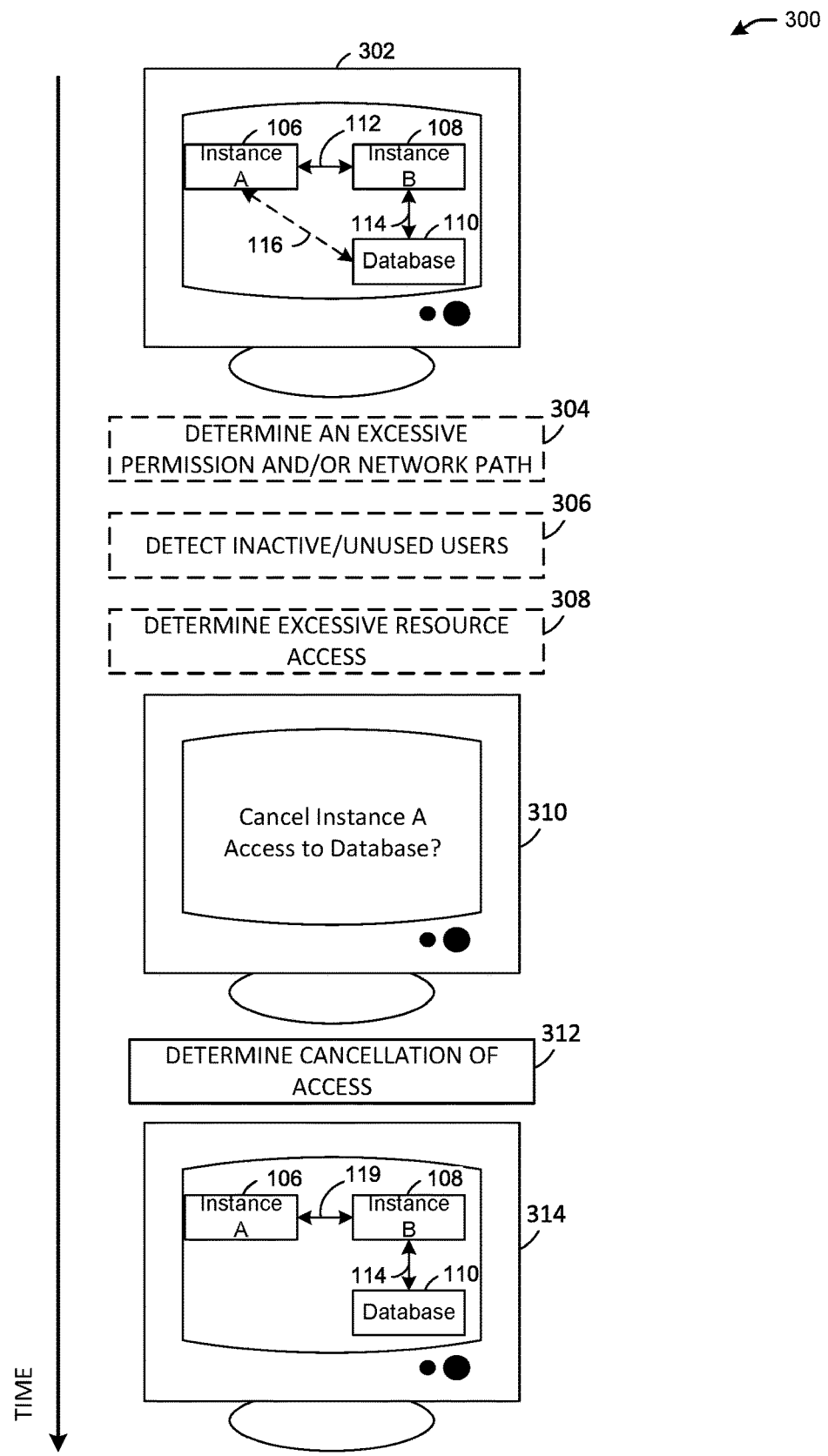
FIG. 3 illustrates a process for controlling access between computer resources, in accordance with one or more example embodiments of the present disclosure.

FIG. 3 illustrates a process 300 for controlling access between computer resources, in accordance with one or more example embodiments of the present disclosure.

Referring to FIG. 3, at operation 302, a graphical output may show reachability graphs including the computing resource instance A 106, computing resource instance B 108, and database resource 110 of FIG. 1. The graphical output may indicate the access 112 between the computing resource instance A 106 and the computing resource instance B 108, which may represent an actual access of the computing resource instance B 108 by the computing resource instance A 106. The graphical output may indicate the access 114 between the computing resource instance B 108 and the database resource 110, which may represent an actual access of the database resource 110 by the computing resource instance B 108. Because the computing resource instance A 106 has access to the computing resource instance B 108, the graphical output may indicate that the computing resource instance A 106 potentially may access the database resource 110 (e.g., directly through an access 116 or transitively through the instance B 108), which may be an undesirable or unintended access as a result of the access 112 and/or JAM permissions associated with the computing resource instance A 106 and the computing resource instance B 108. The graphical output may be a static output indicative of connectivity at a given time or during a given time period, and may represent a combination of multiple reachability graphs.

At operation 304, a computer system (e.g., the computer system 226 of FIG. 2) may determine an excessive permission and/or network path/configuration. An excessive permission may be associated with a resource (e.g., instance A 106, instance B 108, or database resource 110). For example, the computer system may determine that permissions associated with a resource include permitted calls/actions in addition to calls/actions performed by a resource. The computer system may determine that the instance A 106 has write permissions associated with the database resource 110, but has not used the write permission. Instead, the instance A 106 may have read the database resource 110 one or more times. Therefore, the write permission may be identified as an excessive permission. An excessive permission may refer to an IAM role which allows the instance A 106 to call the database 110 when, for example, the intention of the role may be to allow the instance A 106 to see that the database resource 110 is available. An unwanted/excessive network path/configuration may refer to an ability of a resource to access another resource even if that path/configuration has not been used at all or has been used less than a threshold number of times over a given time period. The excessive network path/configuration may allow access to a resource which may be unwarranted, and so the network path/configuration between resources may be cancelled.

At operation 306, the computer system may determine inactive/unused users. If resource-level permissions associated with the instance A 106 is being used by a smaller subset of users/roles/services than are permitted, then inactive/unused users may be identified. For example, if one authorized user is using the instance A 106, but other users are not active or no longer exist, then inactive/unused users may be identified. Users who have been inactive for longer than a period of time may be considered inactive along with users who have never exercised a particular role associated with the instance A 106.

At operation 308, the computer system may determine excessive resource access. Excessive resource access may be identified when a role allows a caller to read or modify more resources than necessary. For example, the access 116 may indicate that the instance A 106 may call on any tables associated with database resource 110 when the instance A 106 may need only to call on a specific table associated with database resource 110.

At operation 310, the computer system may display one or more indications of or recommendations for changes to resource access. The display may include prompts asking a user to make a particular modification (e.g., cancel an access or permission) and/or graphical outputs indicating how connectivity/configurations may be changed by reducing or removing access or permission related to resources or eliminating network configurations between resources. The display may be based on a "what if" analysis (e.g., without call logs) which may identify the impact of changing or eliminating access, permissions, roles, etc. Assessment and remediation processes may consider call log entries (e.g., from event logs 210), and/or data provided by a network configuration manager and an IAM manager (e.g., network configuration manager 218 and IAM manager 222 of FIG. 2).

At operation 312, the computer system may determine a cancellation of the access 116. Cancellation of the access 116 may refer to eliminating a possible network configuration/path between the instance A 106 and the database resource 110, removing an excessive permission, removing an inactive user, reducing user permissions, removing excessive resource access, etc. The cancellation may include modifying the access 112 (e.g., the access 112 becomes access 119 by modifying the security/permission level of the instance A 106). The cancellation may result in the instance A 106 not being able to access the database 110 at all, in certain users not being able to access the database 110, and/or to the access 116 being eliminated even though another type of access between the instance A 106 and the database 110 may be allowed (e.g., write access may be canceled, but read access may be allowed).

At operation 314, the computer system may display an updated graphical output, which may include one or more graphs indicating network connectivity/configurations and/or IAM permissions. As shown in FIG. 3, the graphical output may indicate the access 112 between the computing resource instance A 106 and the computing resource instance B 108, which may represent an actual access of the computing resource instance B 108 by the computing resource instance A 106. The graphical output may indicate the access 114 between the computing resource instance B 108 and the database resource 110, which may represent an actual access of the database resource 110 by the computing resource instance B 108. The access 116 may be eliminated and no longer showing to indicate the update. For example, a network configuration or IAM permission associated with the access 116 may be eliminated.

Figure 4:
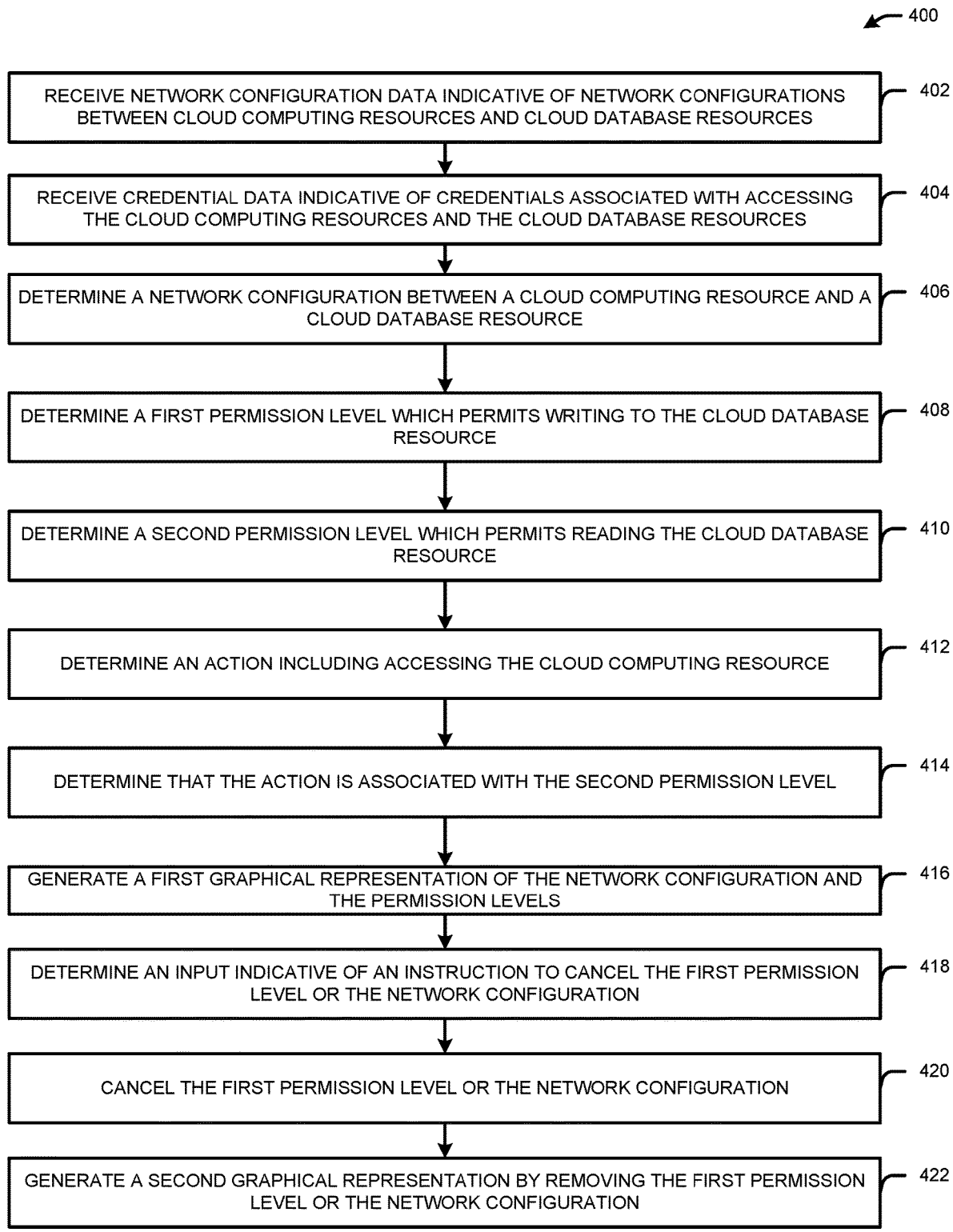
FIG. 4 illustrates a flow diagram for a process for controlling access between computer resources, in accordance with one or more example embodiments of the present disclosure.

FIG. 4 illustrates a flow diagram for a process 400 for controlling access between computer resources, in accordance with one or more example embodiments of the present disclosure.

At block 402, at least one processor of a system (e.g., computer system 226 of FIG. 2) may receive network configuration data (e.g., from network configuration manager 218 of FIG. 2). The network configuration data may indicate any network configuration between computer resources, including network configuration between computing resources (e.g., computing resources 208 of FIG. 2) and data resources (e.g., data resources 206 of FIG. 2) in a cloud (e.g., cloud 204 of FIG. 2). The network configuration may be indicated by calls made to the computer resources, such as a call made by a computer resource to a data resource. Evidence of such calls may be provided to an event log (e.g., event logs 210 of FIG. 2), and may indicate actions associated with the calls. For example, an action may include access, reading, writing, sending data, etc. A network configuration may indicate that computer resources may be accessed either by other computer resources or by resources/devices which are connected to computer resources having network configuration to other computer resources.

At block 404, the at least one processor may receive credential/permission data (e.g., from the IAM manager 222 of FIG. 2). The credential/permission data may indicate the use of IAM permissions/credentials used to access computer resources on the cloud. The evidence of credential/permission data may be stored on the cloud and provided to the IAM manager. For example, when a user account is used to log in to access a computer resource and/or to access a computer resource and take an action (e.g., to write to a database), the log in may be stored on the cloud and provided to an IAM manager. The log in and associated credentials of user accounts, roles, etc. may be provided to the device.

At block 406, the at least one processor may determine a network configuration between a cloud computing resource and a cloud database resource. For example, the network connectivity/configuration data may indicate that an instance associated with the cloud computing resource was used to access the cloud database resource or may be used to access the cloud database resource. The accessing of the cloud database resource by the cloud computing resource may indicate network connectivity between the resources. Possible access of the cloud database resource may indicate a possible network configuration which may be used.

At block 408, the at least one processor may determine a permission level which permits writing to the cloud database resource. For example, the permission/credential data may indicate that one or more user accounts, roles, etc. associated with the cloud computing resource (e.g., permitted to use the cloud computing resource) may have permission to access the database resource. If a user account uses a permission level which allows the user account to access the database resource from the computing resource, then the permission level may be evaluated for a vulnerability. The permission level may allow a user account to perform one or more actions such as reading the database resource, writing to the database resource, sending messages, changing access rules, etc.

At block 410, the at least one processor may determine a second permission level which permits reading the database resource from the computing resource. A user account or group role may include multiple permission levels. For example, a user account may have a permission level which allows both reading and writing to the database resource, and another user account may have a permission level which allows reading the database resource, but not writing to the database resource. Because there is network connectivity or a network configuration between a computing resource and a database resource, then a vulnerability may be identified if there is also a permission level which may allow using the network connectivity/configuration to access and perform certain actions associated the database resource. For example, write access to the database resource may be permitted by a permission level when user accounts of a computing resource may need read access, but not the write access.

At block 412, the at least one processor may determine an action which may include accessing the cloud computing resource. For example, the action may include a user account using a credential to log into the computing resource and to access the database resource. Access of the cloud computing resource may indicate a network configuration and/or IAM permissions which may facilitate or allow the access.

At block 414, the at least one processor may determine that the action is associated with the second permission level. For example, the action may include a user account using an instance of the computing resource to read a table from the database resource. However, the user account may have a permission level allowing the user account to perform additional actions such as writing, or reading more tables than the user account is reading. Such may indicate a vulnerability.

At block 416, the at least one processor may generate a first graphical representation of the network configuration. The graphical representation may include indications of the permission levels, the computer resources, related actions, etc. The graphical representation may limit indications of network configurations and permissions to show those associated with a possible vulnerability. The graphical representation may be presented on the device or sent to another device for presentation.

At block 418, the at least one processor may determine an input indicative of an instruction to cancel the first permission level and/or the network configuration. The input may be a user input received by a user confirming the user's preference to cancel a permission and/or prevent a network configuration between computer resources. The device may present recommendations to remediate vulnerabilities by canceling permissions and/or network configurations if the vulnerabilities are significant enough (e.g., based on threat levels associated with different types of computer resources, historical usage of vulnerable network configurations and permission levels, etc.).

At block 420, the at least one processor may cancel the first permission level and/or the first network configuration. Canceling may include scaling back a permission of a user account, group, or role, eliminating permissions or user accounts, reducing access or actions allowed, eliminating a network configuration, etc. The canceling may occur in response to user inputs and/or automatically based on identified vulnerabilities rising to a significant threat level.

At block 422, the at least one processor may generate a second graphical presentation in which still-existing network configurations between computer resources may be indicated, but the first permission level and/or the network configuration may be indicated as removed.

Figure 5:
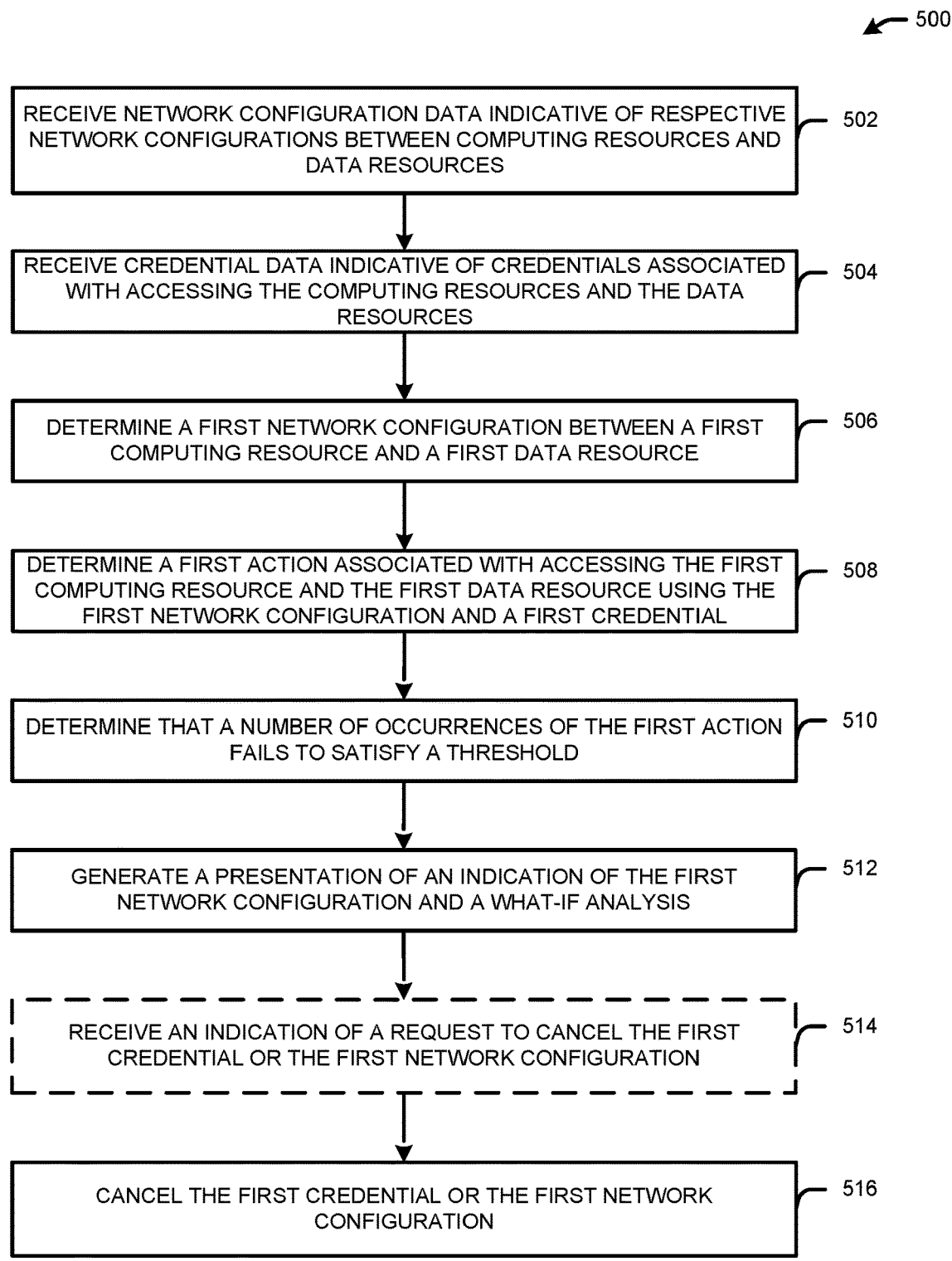
FIG. 5 illustrates a flow diagram for a process for controlling access between computer resources, in accordance with one or more example embodiments of the present disclosure.

FIG. 5 illustrates a flow diagram for a process 500 for controlling access between computer resources, in accordance with one or more example embodiments of the present disclosure.

At block 502, at least one processor of a system (e.g., computer system 226 of FIG. 2) may receive network connection data indicating network configurations between a computing resource and a data resource (e.g., computing resources 208 and data resources 206 of FIG. 2). For example, one or more requests/calls (e.g., as indicated by logs 210 of FIG. 2) may indicate that a computing resource has made a request/call to a data resource, or vice versa. Information indicating the network configurations may be received by the system (e.g., from network configuration manager 218 of FIG. 2) and used to identify the network configurations, the computing resource, and the data resource.

At block 504, the at least one processor may receive credential/permission data (e.g., from the IAM manager 222 of FIG. 2). The credential/permission data may indicate the use of IAM permissions/credentials used to access computer resources on the cloud. The evidence of credential/permission data may be stored on the cloud and provided to the IAM manager. For example, when a user account is used to log in to access a computer resource and/or to access a computer resource and take an action (e.g., to write to a database), the log in may be stored on the cloud and provided to an IAM manager. The log in and associated credentials of user accounts, roles, etc. may be provided to the device.

At block 506, the at least one processor may determine a network configuration between a computing resource and a data resource. For example, the network connectivity/configuration data may indicate that an instance associated with the computing resource was or may be used to access the data resource. The actual or possible accessing of the data resource by the computing resource may indicate network configurations between the resources.

At block 508, the at least one processor may determine a first action associated with a computing resource and a data resource using the network configuration and a first credential. For example, the action may indicate that the computing resource read, wrote to, or searched at least one table associated with a database resource, or that the database resource used the computing resource (e.g., saved database tables to a cloud computing resource or relied on run code executed on cloud computers). The computing resource and/or data resource may be associated with multiple actions which use the network connection between them. The system may identify patterns (e.g., common actions), users, roles, and permissions associated with the computing resource and/or database resource. The actions identified as having been executed/performed may be less than what may be permitted based on network connectivity, configurations, and IAM roles/permissions, for example.

At block 510, the at least one processor may determine a number of occurrences of the action (e.g., how many times the action occurred). If the action is a read action, for example, the number of times the computing resource called the data resource to read data from the data resource may represent the number of occurrences. The number of occurrences may be considered with a threshold and/or amount of time. For example, if an action is permitted, but never executed, then the action may not be appropriate, and may be a vulnerability which may be mitigated by reducing a permission. If the action has been used, but not often and/or not recently, then the action may be considered a vulnerability.

At block 512, the at least one processor may generate a presentation of a first indication of the network connection. The presentation may include a graphical representation of the network configuration between the computing resource and the database resource, along with IAM connectivity/configurations indicating the reachability associated with the computing resource and the database resource. The presentation also may include one or more recommendations, such as a recommendation to cancel a permission or network configuration associated with the second action. For example, if a write to permission is not being used and is excessive, then a recommendation may include canceling the write to permission. The recommendation may include recommendations to eliminate users, roles, network configurations between resources, excessive resource access, etc. The presentation may include a "what if" analysis which may show the results of possible modifications to access and permissions. The what if analysis may provide indications of all possible resource access based on network configurations/paths and permissions. A user may be presented with options for modifying/restricting access based on network configurations and permissions. If the what if analysis is not used (e.g., if modifications are made automatically), the modifications to network configurations and permissions may be made based on determinations regarding how other network configurations and permissions may be affected by removing access/permissions. For example, if a first resource may access a second resource, and the second resource may access a third resource, then eliminating a permission or network configuration allowing the second resource to access the third resource may eliminate the first resource's ability to access the third resource through the second resource. If such a modification would not result in an unintended modification to an access which may not be considered a vulnerability, then the modification may be made.

At block 514, the at least one processor may receive an indication to cancel a credential and/or network configuration used to perform the action. The at least one processor may cause presentation of options or recommendations prompting user input (e.g., a selection of whether to cancel a permission or network configuration). The request may be based on a user input confirming a user's desire to cancel a permission such as additional permission not being used, user accounts not being used, etc. The user may be presented with options and recommendations indicating available modifications, and the impact that such modifications may have (e.g., loss of network configurations, permissions, user accounts, etc.).

At block 516, the at least one processor may cancel one or more credentials or network configurations associated with the second action. The cancellation may be automatic upon identifying an unused or underused action or user account, or may be based on user inputs indicating a preference to cancel a given permission or configuration. Cancellations may include eliminating network configurations, removing excessive permissions, unused user accounts, excessive resource access, etc. The at least one processor may cause display of one or more additional graphical representations indicating canceled permissions and/or network configurations.

Figure 6:
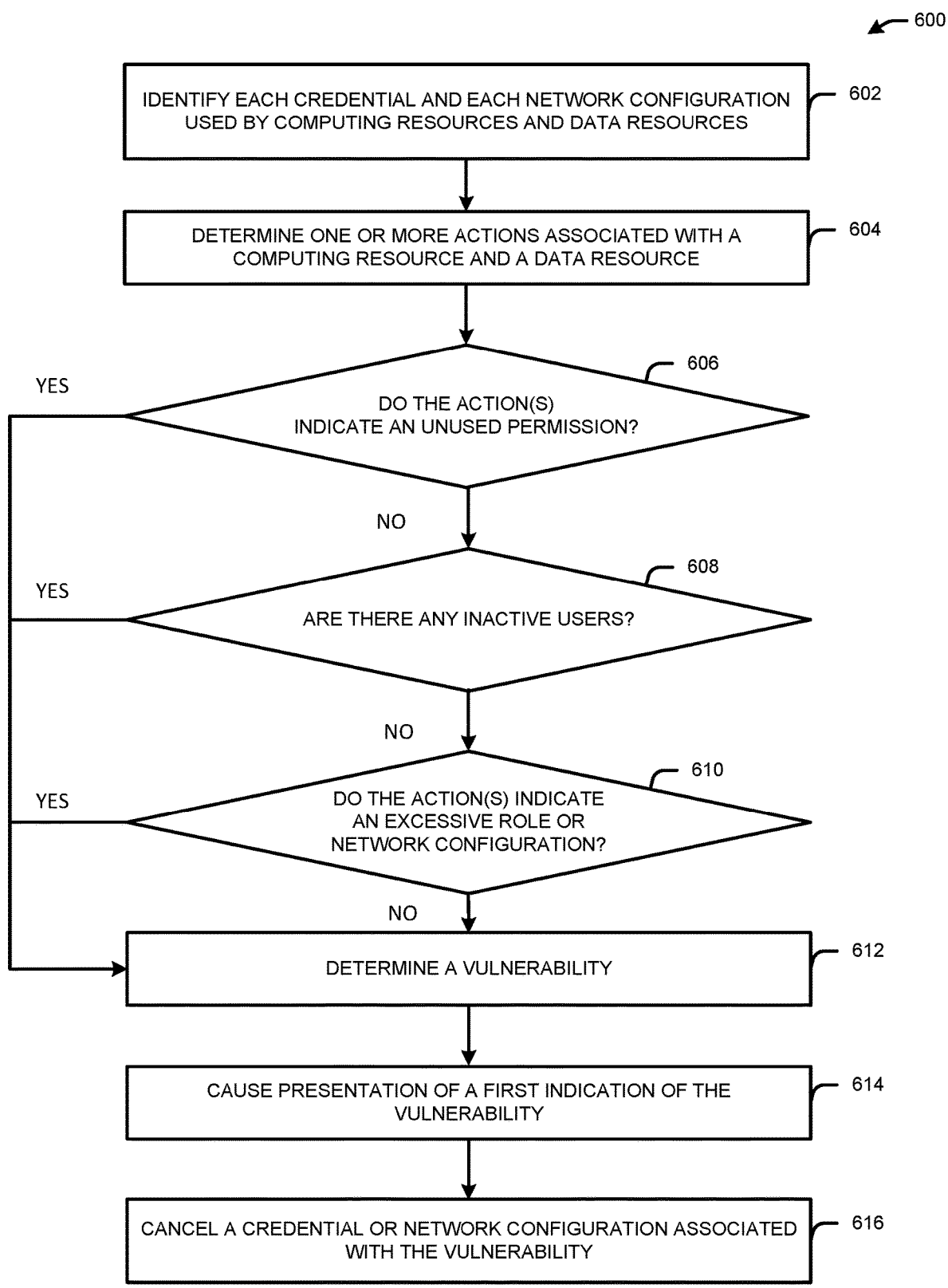
FIG. 6 illustrates a flow diagram for a process for controlling access between computer resources, in accordance with one or more example embodiments of the present disclosure.

FIG. 6 illustrates a flow diagram for a process 600 for controlling access between computer resources, in accordance with one or more example embodiments of the present disclosure.

At block 602, at least one processor of a system (e.g., the computer system 102 of FIG. 1) may identify any network configurations between a computing resource and a data resource, and may identify any credentials used in association with the network configurations. For example, one or more requests/calls (e.g., as indicated by logs 210 of FIG. 2) may indicate that a computing resource has made a request/call to a data resource, or vice versa, and which credentials may have been used to access a resource. Information indicating the network configurations may be received by the system and used to identify the network configurations, the computing resource, and the data resource. Information indicating used and available credentials may be received by the system and used to identify permissions associated with actions taken when a resource is accessed.

At block 604, the at least one processor may determine one or more actions associated with the computing resource and the database resource. For example, the action may indicate that the computing resource read, wrote to, or searched at least one table associated with the data resource, or that the data resource used the computing resource (e.g., saved database tables to a cloud computing resource or relied on run code executed on cloud computers). The computing resource and/or database resource may be associated with multiple actions which use the network configurations between them. The system may identify patterns (e.g., common actions), users, roles, and permissions associated with the computing resource and/or database resource. The actions identified as having been executed/performed may be less than what may be permitted based on network configurations and IAM roles/permissions, for example.

At block 606, the at least one processor may determine whether any actions indicate an unused permission (e.g., an excessive permission). For example, if the action is associated with a permission level (e.g., a permission allowing any action to be taken with regard to the data resource), but a typical access patter indicates that only some tables are being accessed by the computing resource or that the computing resource is reading tables without making any modifications to the data resources, then an excessive permission may be identified. If an excessive permission is identified, then the process 600 may proceed to block 612. If no permissive permission is identified, then the process 600 may proceed to block 608.

At block 608, that at least one processor may determine whether there are any inactive/unused/depreciated users. For example, if the computing resource or database resource is accessed by a smaller subset of users/roles/services than may be specified in resource-based permissions, then inactive users may be identified. The data resource may allow multiple IAM users to write to it, but only one user may be active. Other users may be indicated as inactive for a period of time or may have never used their logins. A role may be attached to some IAM users who have been inactive for a time, or the role may be associated with the computing resource and the computing resource may never exercise the role. If any inactive/unused/depreciated users are identified, the process 600 may proceed to block 612. If no inactive/unused/depreciated users are identified, the process 600 may proceed to block 610.

At block 610, the at least one processor may determine whether the action or any other actions associated with the computing resource or the data resource indicate an excessive role and/or network configuration. An excessive role may be identified when a role permits a caller to read/modify more resources than necessary for an application associated with the resource using the role. For example, if the computing resource is associated with a role which allows API calls to the data resource on all database tables associated with a user account, but an application using the computing resource may only need access to a single table or subset of tables of the data resource. An excessive network configuration may allow access to a resource which may be unnecessary or unintended, and the network configuration may be eliminated by canceling a path between resources.

At block 612, the at least one processor may determine a vulnerability associated with the computing resource or the database resource. The vulnerability may be identified at block 606, block 608, and/or block 610. For example, a vulnerability may include an excessive permission. If a resource is permitted to perform an action, but calls/requests indicate that the resource is not exercising the permission (e.g., is not performing a permitted action), then the unexercised permission may be indicative of a vulnerability. Inactive/unused/depreciated users may represent a vulnerability because users may be permitted to access resources and perform actions associated with those resources, and if the users are inactive, then the users are not performing the permitted action. Excessive roles may indicate vulnerabilities because permissions associated with a role may allow actions which are unnecessary excessive for tasks associated with an application using a resource. The vulnerability may be an unwanted network configuration/path which may be eliminated to prevent access of one resource by another resource.

At block 614, the at least one processor may cause presentation of a first indication of the network configuration and the vulnerability. For example, the presentation may include a graphical representation of the network configurations between the computing resource and the data resource, along with IAM configurations indicating the reachability associated with the computing resource and the data resource. The presentation may indicate the vulnerability so that a user may see available configurations and may recognize potential vulnerabilities which may be eliminated. The presentation also may include one or more recommendations, such as a recommendation to cancel a permission or configuration associated with the vulnerability. For example, if a write to permission is not being used and is excessive, then a recommendation may include canceling the write to permission. The recommendation may include recommendations to eliminate users, roles, network configurations between resources, excessive resource access, etc. The presentation may include a "what if" indication which may show the results of possible modifications to access and permissions.

At block 616, the at least one processor may cancel a credential and/or network configuration associated with the vulnerability. Canceling may include eliminating network configurations/paths, users, roles, network configurations between resources, excessive resource access, etc. An updated presentation may be generated to indicate that the credential and/or configuration has been canceled.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   receiving network configuration data indicative of respective network configurations between two or more cloud computing resources and two or more cloud database resources;
   receiving credential data indicative of one or more credentials associated with accessing at least one of the two or more cloud computing resources or the two or more cloud database resources;
   determining a first network configuration of the respective network configurations, wherein the first network configuration is between a first cloud computing resource of the two or more cloud computing resources and a first cloud database resource of the two or more cloud database resources;
   determining, based at least in part on the one or more credentials, a first permission level associated with the first cloud computing resource, wherein the first permission level permits writing to the first cloud database resource;
   determining a second permission level associated with the first cloud computing resource, wherein the second permission level permits reading the first cloud database resource;
   determining an action including accessing the first cloud computing resource;
   determining that the action is associated with the second permission level;
   generating a first graphical representation of the first network configuration, the first permission level, and the second permission level;
   determining an input indicative of an instruction to cancel the first permission level;
   canceling at least one of the first permission level or the first network configuration; and
   generating a second graphical representation, wherein generating comprises removing at least one of the first permission level or the first network configuration from the first graphical representation.

2. The method of claim 1, wherein the action is a first action, further comprising:
   determining a second action associated with accessing the first cloud computing resource and the first cloud database resource;
   determining that the second action is associated with the second permission level; and
   determining, based on the first action and the second action, an excessive permission, wherein the first graphical representation indicates the excessive permission.

3. The method of claim 1, further comprising:
   identifying a user account associated with the first cloud computing resource;
   determining that the user account has been inactive for a period of time; and
   indicating that the user account no longer has the first permission level.

4. The method of claim 1, further comprising:
   identifying a user account associated with the first cloud computing resource;
   determining a role associated with the user account; and
   determining that the first permission level exceeds the role, wherein canceling at least one of the first permission level or the first network configuration is based on determining that the first permission level exceeds the role.

5. A method, comprising:
   receiving, by at least one processor of a device, network configuration data indicative of respective network configurations between two or more computing resources and two or more data resources;
   receiving credential data indicative of one or more credentials, the one or more credentials including a first credential, wherein the first credential is associated with accessing a first computing resource of the two or more computing resources and a first data resource of the two or more data resources;
   determining a first network configuration of the respective network configurations, wherein the first network configuration is between the first computing resource and the first data resource;

determining a first action associated with accessing at least one of the first computing resource or the first data resource using the first network configuration and the first credential;

determining that a number of occurrences of the first action fails to satisfy a threshold;

determining that a second network configuration associated with at least one of the first computing resource or the first data resource will be modified by canceling at least one of the first credential or the first network configuration; and canceling at least one of the first credential or the first network configuration.

6. The method of claim 5, the method further comprising:
determining a second action associated with accessing the first computing resource or the first data resource;
determining that the second action is not associated with the first credential; and
determining, based on the second action and the first action, an excessive permission, wherein the presentation further indicates the excessive permission.

7. The method of claim 5, wherein at least one of the first computing resource or the first data resource is associated with a user account, further comprising determining that the user account has been inactive for a period of time.

8. The method of claim 5, wherein at least one of the first computing resource or the first data resource is associated with a user account, the method further comprising:
determining a second action associated with accessing the first computing resource or the first data resource;
determining that the first credential is associated with the user account; and
determining that the second action exceeds the first credential.

9. The method of claim 5, wherein at least one of the first computing resource or the first data resource is associated with a user account, the method further comprising:
determining a second action associated with accessing the first computing resource or the first data resource;
determining a role associated with the user account; and
determining that the second action is not associated with the role.

10. The method of claim 5, wherein canceling the first credential is based on the determination that the number of occurrences fails to satisfy the threshold.

11. The method of claim 5, further comprising determining an indication of a request to cancel at least one of the first credential or the first network configuration.

12. The method of claim 5, further comprising:
presenting an indication that the second network configuration will be modified by cancelling at least one of the first credential or the first network configuration.

13. The method claim 5, wherein the first action is associated with a computer connected to the first computing resource or the first data resource, wherein the computer accesses the first computing resource through the first data resource or accesses the first data resource through the first computing resource.

14. The method of claim 5, further comprising changing a presentation of the respective network configurations to remove the first network configuration.

15. A system, comprising:
memory storing computer executable instructions; and
at least one processor configured to access the memory and execute the computer executable instructions to:

receive network configuration data indicative of respective network configurations between two or more computing resources and two or more data resources;

receive credential data indicative of one or more credentials, the one or more credentials including a first credential, wherein the first credential is associated with accessing a first computing resource of the two or more computing resources and a first data resource of the two or more data resources;

determine a first network configuration of the respective network configurations, wherein the first network configuration is between the first computing resource and the first data resource;

determine a first action associated with accessing at least one of the first computing resource or the first data resource using the first network configuration and the first credential;

determine that a number of occurrences of the first action fails to satisfy a threshold;

determine that a second network configuration associated with at least one of the first computing resource or the first data resource will be modified by canceling at least one of the first credential or the first network configuration; and cancel at least one of the first credential or the first network configuration.

16. The system of claim 15, the at least one processor further configured to access the memory and execute the computer executable instructions to:
determine a second action including accessing the first computing resource or the first data resource;
determine that the second action is not associated with the first credential; and
determine, based on the second action and the first action, an excessive permission, wherein the presentation further indicates the excessive permission.

17. The system of claim 15, wherein at least one of the first computing resource or the first data resource is associated with a user account, the at least one processor further configured to access the memory and execute the computer executable instructions to determine that the user account has been inactive for a period of time.

18. The system of claim 15, wherein at least one of the first computing resource or the first data resource is associated with a user account, the at least one processor further configured to access the memory and execute the computer executable instructions to:
determine a second action including accessing the first computing resource or the first data resource;
determine a role associated with the user account; and
determine that the second action exceeds the role.

19. The system of claim 15, wherein at least one of the first computing resource or the first data resource is associated with a user account, the at least one processor further configured to access the memory and execute the computer executable instructions to:
determine a second action including accessing the first computing resource or the first data resource;
determine a role associated with the user account;
determine that the second action is not associated with the role.

20. The system of claim 15, the at least one processor further configured to access the memory and execute the computer executable instructions to identify an indication of a request to cancel at least one of the first credential or the first network configuration.

* * * * *